United States Patent [19]

Sandesara

[11] Patent Number: 5,179,548
[45] Date of Patent: Jan. 12, 1993

[54] SELF-HEALING BIDIRECTIONAL LOGICAL-RING NETWORK USING CROSSCONNECTS

[75] Inventor: Niranjan B. Sandesara, Freehold, N.J.

[73] Assignee: Bell Communications Research, Inc., Livingston, N.J.

[21] Appl. No.: 722,051

[22] Filed: Jun. 27, 1991

[51] Int. Cl.[5] .............................................. H04J 3/14
[52] U.S. Cl. ................................ 370/16.1; 370/85.12; 370/94.3
[58] Field of Search .................... 370/16, 16.1, 85.11, 370/85.12, 94.3; 371/8.2, 11.1, 11.2

[56] References Cited

U.S. PATENT DOCUMENTS

| | | | |
|---|---|---|---|
| 4,740,958 | 4/1988 | Duxbury et al. | 370/85.12 |
| 4,835,763 | 5/1989 | Lau | 370/85.12 |
| 4,947,389 | 8/1990 | Eng et al. | 370/85.12 |
| 5,003,531 | 3/1991 | Farinholt et al. | 370/16.1 |

OTHER PUBLICATIONS

"Self-Healing Fibre Optic Rings for SONET Networks", I. Hawker et al. Contribution T1X1.5-046, to T1M1/T1X1 Ad Hoc Committee, Oct. 1988.
"Definitions of Ring Architectures", Bellcore Contribution to T1 Standards Project-T1X1.5, Nov. 5, 1990.
"Wideband and Broadband Digital Cross-Connect Systems Generic Requirements and Objectives", Technical Ref. TR-TSY-000233, Issue 2, Sep. 1989.

Primary Examiner—Douglas W. Olms
Assistant Examiner—Wellington Chin
Attorney, Agent, or Firm—Leonard Charles Suchyta; Loria J. Baskerville

[57] ABSTRACT

A bidirectional logical-ring network employs crossconnect nodes, which partition the network into segments and interconnect segments at the subchannel level to form logical ring structures. All segments are independent, and each segment includes a subset of Add-Drop Multiplex nodes (ADMs) and two pairs of links, one working and one protection. The formation of logical rings from the interconnection of independent segment subchannels preserves the self-healing advantages of conventional bidirectional ring networks and allows greater flexibility to effeciently accommodate bandwidth upgrade requests.

8 Claims, 18 Drawing Sheets

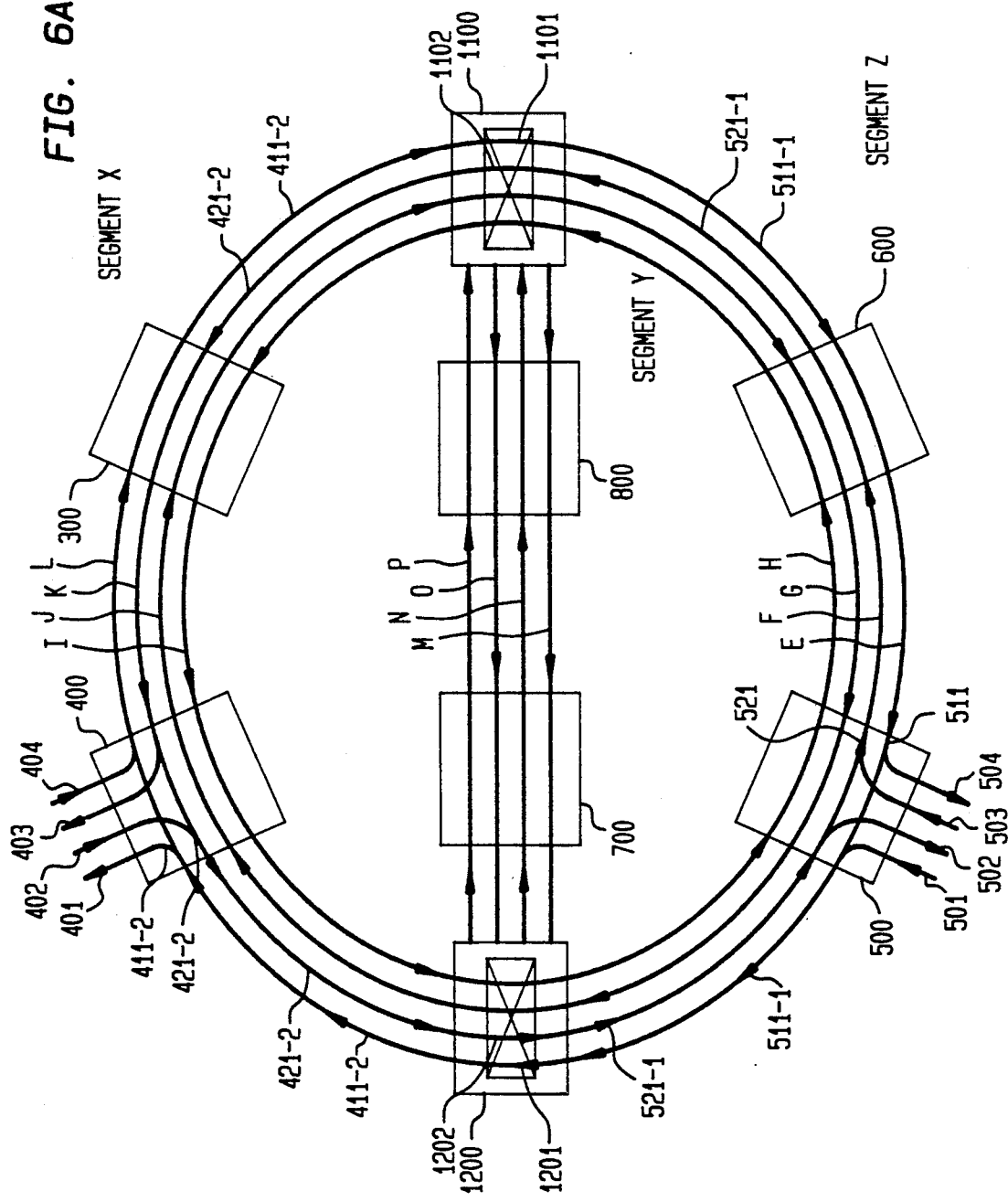

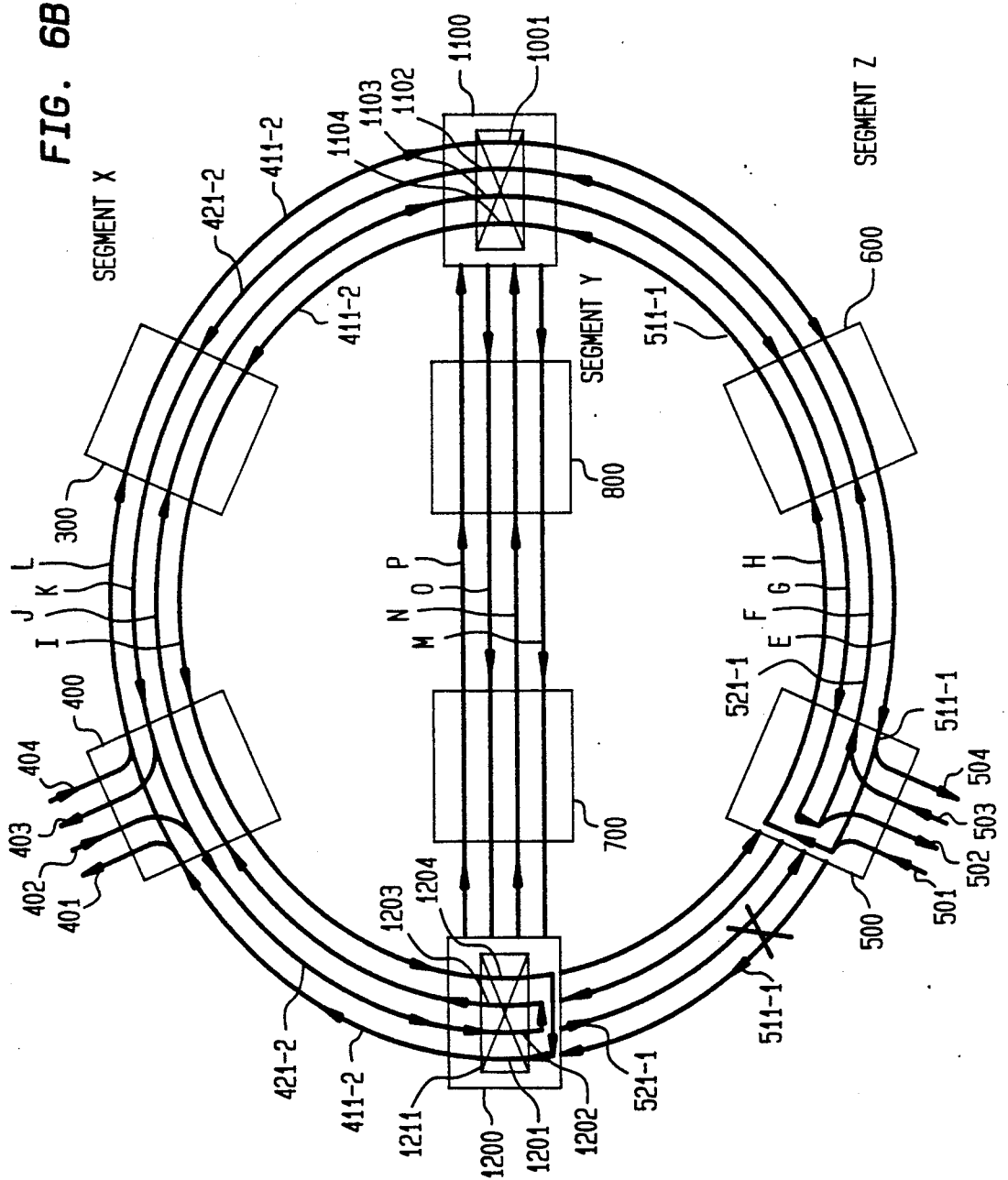

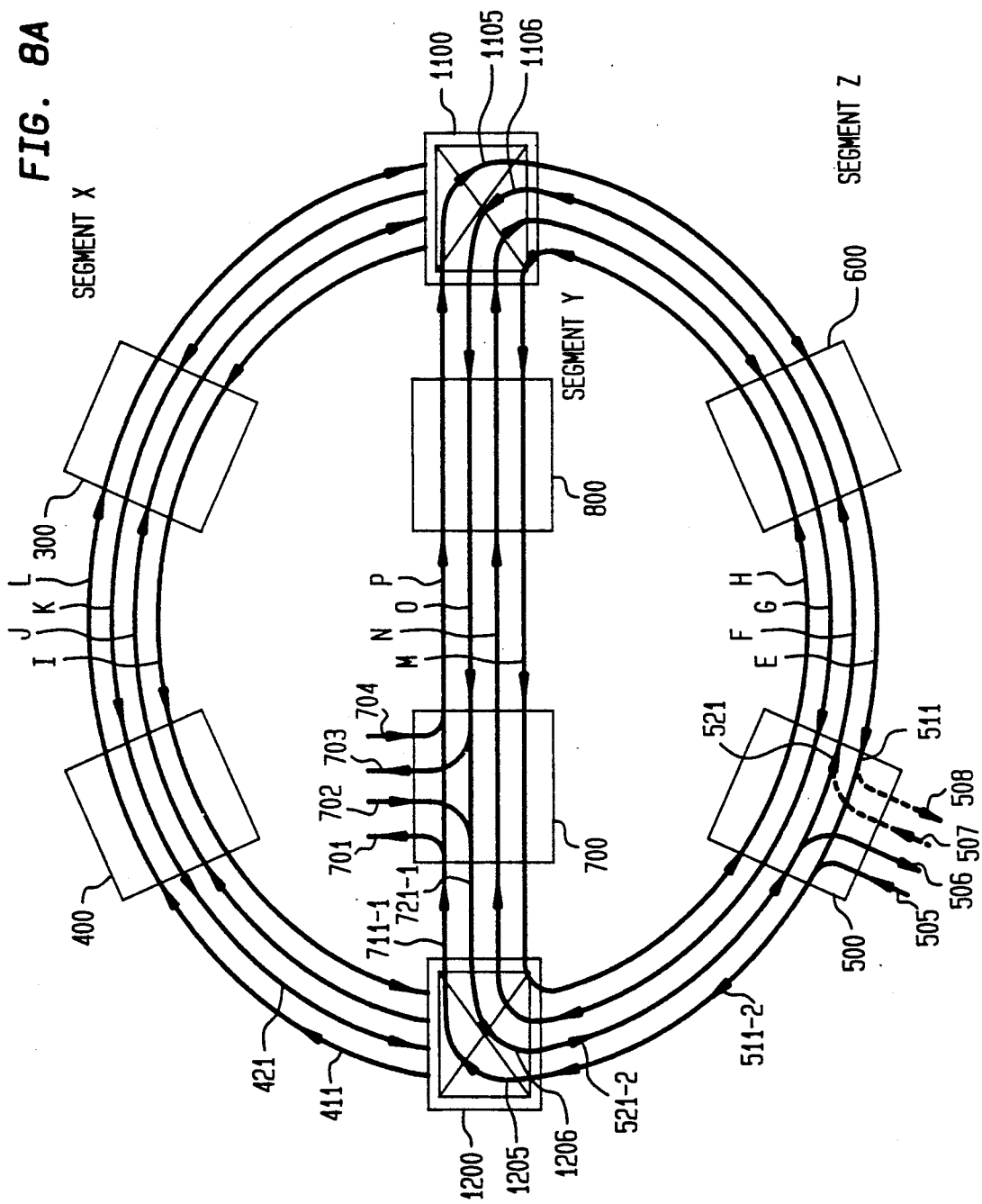

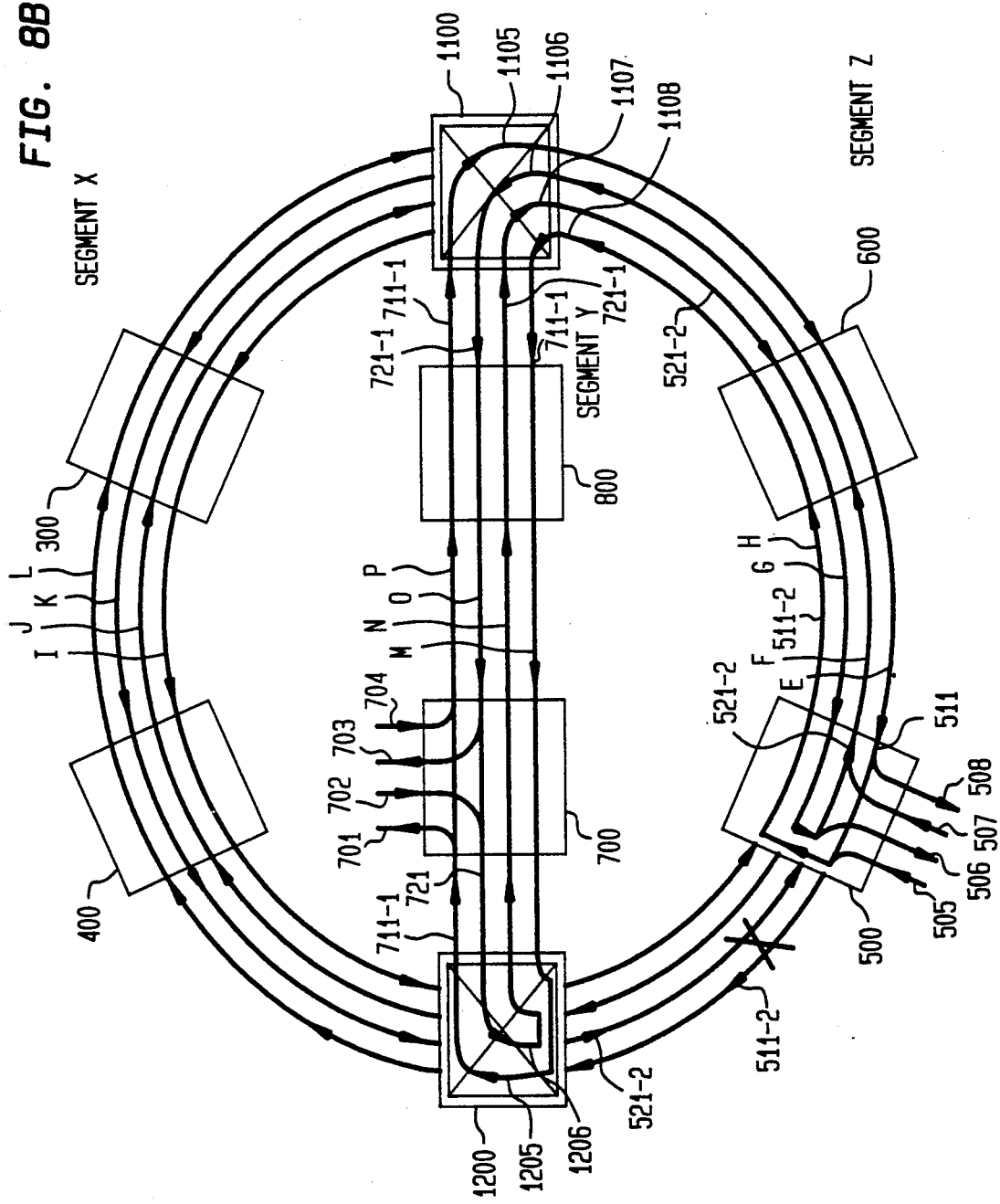

SELF-HEALING BIDIRECTIONAL LOGICAL-RING NETWORK USING CROSSCONNECTS

1. CROSS-REFERENCE TO RELATED APPLICATIONS

The following U.S. applications assigned to the same assignee contain related subject matter: Self-Healing Meshed Network Using Logical Ring Structures Ser. No. 07/577,219, filed of N. Sandesara, and A Dual-Hubbed Arrangement To Provide A Protected Ring Interconnection, Ser. No. 07/577,273, filed of J. Sosnosky.

2. FIELD OF INVENTION

The invention generally relates to a communications network and, more specifically, to a self-healing network of logical bidirectional ring structures.

3. BACKGROUND OF THE INVENTION

Ring networks provide a continuous transmission structure between nodes connected in tandem. Each node receives transmission from an adjacent upstream node, extracts information destined for it, re-transmits information destined for other nodes located further downstream, and adds information destined for other nodes on the ring.

Two distinct categories of ring networks as described in "Definitions of Ring Architectures", Contribution T1X1.5/90-179, to T1 Standards Project-T1X1.5 Nov. 5, 1988, by J. Sosnosky et al., are commonly referred to as unidirectional and bidirectional. Unidirectional networks, as discussed in my prior patent application Ser. No. 07/577,219, are characterized by having upstream and downstream information transported between nodes over opposite transmission routes yet on the same transmission link. Conversely, bidirectional ring networks, upon which may present invention is based, are characterized as having upstream and downstream information transported between nodes over the same transmission route, but on two separate transmission links.

A drawback of both categories of ring networks is that a break in the ring would prevent any node upstream of the break from communicating with any node downstream of the break over the path containing the break. Similarly, a complete failure of a node would have the same effect as a break in the ring physical link. To improve the survivability of ring networks under such abnormal conditions, self-healing features have been implemented which provide resiliency to network failures.

Unidirectional and bidirectional networks can also differ in the self-healing technique and the number of protection links required to provide protection capability in the event of a break in the transmission link or a node failure. Unidirectional rings generally employ a signal duplication technique and one additional transmission link for protection, but bidirectional rings generally employ a loop-back technique and two additional protection transmission links which remain unused under normal operation.

Although unidirectional and bidirectional networks are distinct structures generally employing a different number of transmission links and a different self-healing technique, communication between nodes in both networks is accomplished in a similar fashion. For both ring structures, the same signal structure consisting of a predetermined number of subrate multiplexed channels operating at a fixed rate is transported around the ring between all nodes. Since all links and nodes in both unidirectional and bidirectional networks transport signals having the same fixed rate and multiplexed subchannel structure, all links and nodes are required to have adequate transmission capacity to accommodate the total rate of all multiplexed subchannels. This high bandwidth requirement imposed upon network nodes and links makes network deployment cost-prohibitive. Given the high bandwidth of the total multiplexed signal structure, there is little spare bandwidth to meet upgrade requests.

These shortcomings as well as other limitations and deficiencies of unidirectional ring networks have been obviated by the invention of my prior patent application Ser. No. 07/577,219. As disclosed in my prior application, a unidirectional ring network is configured as logical rings each composed of segments interconnected at the subchannel level by crossconnect nodes such that each segment can operate at a different rate, can have a different signal structure, and can contain a different number of subchannels within the signal transported on each segment.

The object of my present invention is to overcome the deficiencies of bidirectional self-healing ring networks by configuring these networks as segments interconnected at the subchannel level by crossconnect nodes to form logical-ring networks.

4. SUMMARY OF THE INVENTION

My invention obviates the shortcomings and deficiencies of conventional bidirectional ring networks by employing crossconnect nodes to partition this network into independent segments. The crossconnect nodes interconnect the network segments at the subchannel level such that a logical ring structure is preserved and network survivability and other attributes of a ring network are maintained.

Each segment comprises a subset of network ADMs and two pairs of links (one working pair and one protection pair) which pass through the ADMs. Each segment propagates signals of multiplexed subchannels, and the structure of these signals can differ between segments. Therefore, the multiplexed signals of each segment can operate at an independent rate and employ a distinct number of subchannels that is different from other network segments.

Each segment is terminated at both ends by crossconnect nodes. Crossconnect nodes interconnect incoming subchannels from one segment to outgoing subchannels of one of a plurality of segments such that interconnected subchannels are configured as logical rings. The assigned interconnection of subchannels between segments at a crossconnect node may be static and hard wired into the crossconnect node, or a management node can dynamically provide interconnection assignments. The crossconnect node also has loop-back capabilities for switching working links onto protection links to loop around a network failure occurring adjacent to the crossconnect node.

By partitioning the network into independent segments using crossconnect nodes, the self-healing advantages of conventional bidirectional rings are preserved since logical ring structures are maintained through the interconnection of segments at the subchannel level. As a significant improvement over conventional networks, the use of crossconnect nodes also creates multiple logical-ring routing options for greater flexibility in accommodating bandwidth upgrade requests. If the available bandwidth capacity is insufficient to meet upgrade requests, under my invention, only transmission equipment located on the exhausted segment would require replacement contrary to conventional ring networks which would require that transmission equipment throughout the network be replaced.

My invention also relaxes the transmission requirements imposed upon all ADMs and links of conventional bidirectional ring networks to operate at the total rate of the multiplexed signal propagating in the ring between all ADMs. Under my invention, ADMs and links of a segment need only accommodate the rate of the multiplexed signal propagating in the segment.

5. BRIEF DESCRIPTION OF THE DRAWING

FIGS. 6A and 6B illustrate the configuration of a bidirectional ring structure under normal and failure conditions, respectively, in accordance with an illustrative embodiment of my invention;

FIGS. 8A and 8B depict communication between ADMs of different network segments Y and Z under normal and failure conditions, respectively;

Figure 10:
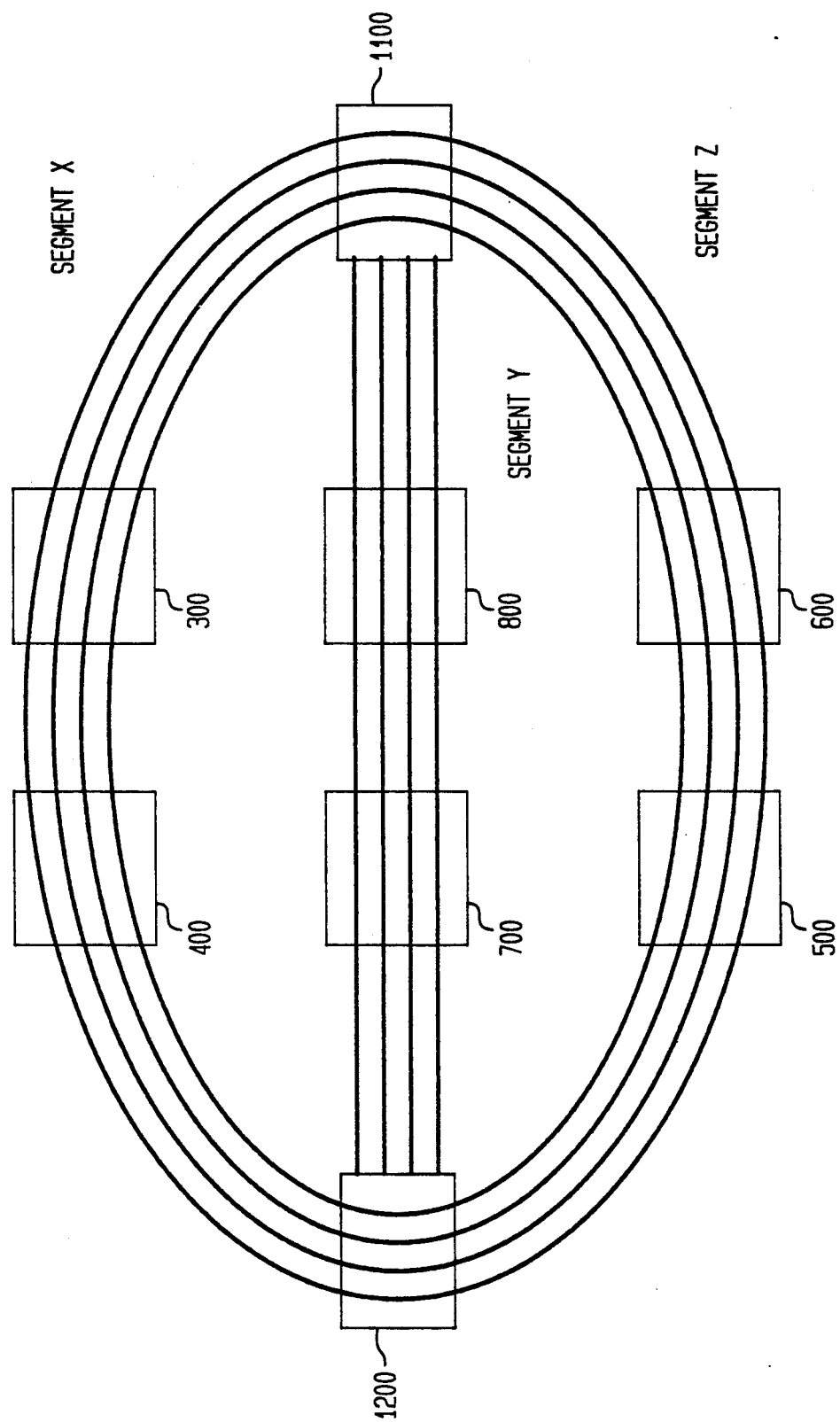
Figure 11:
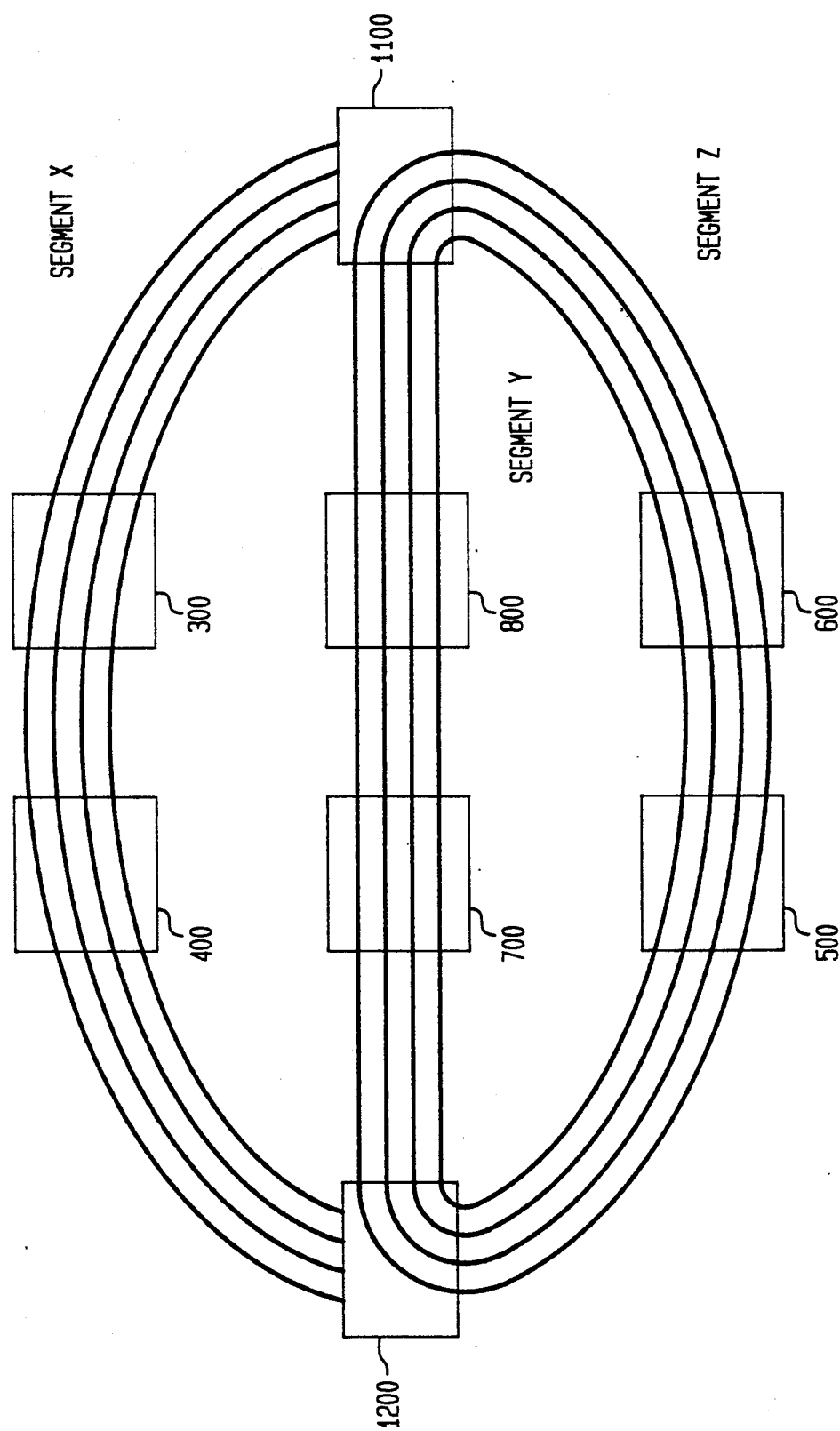
Figure 12:
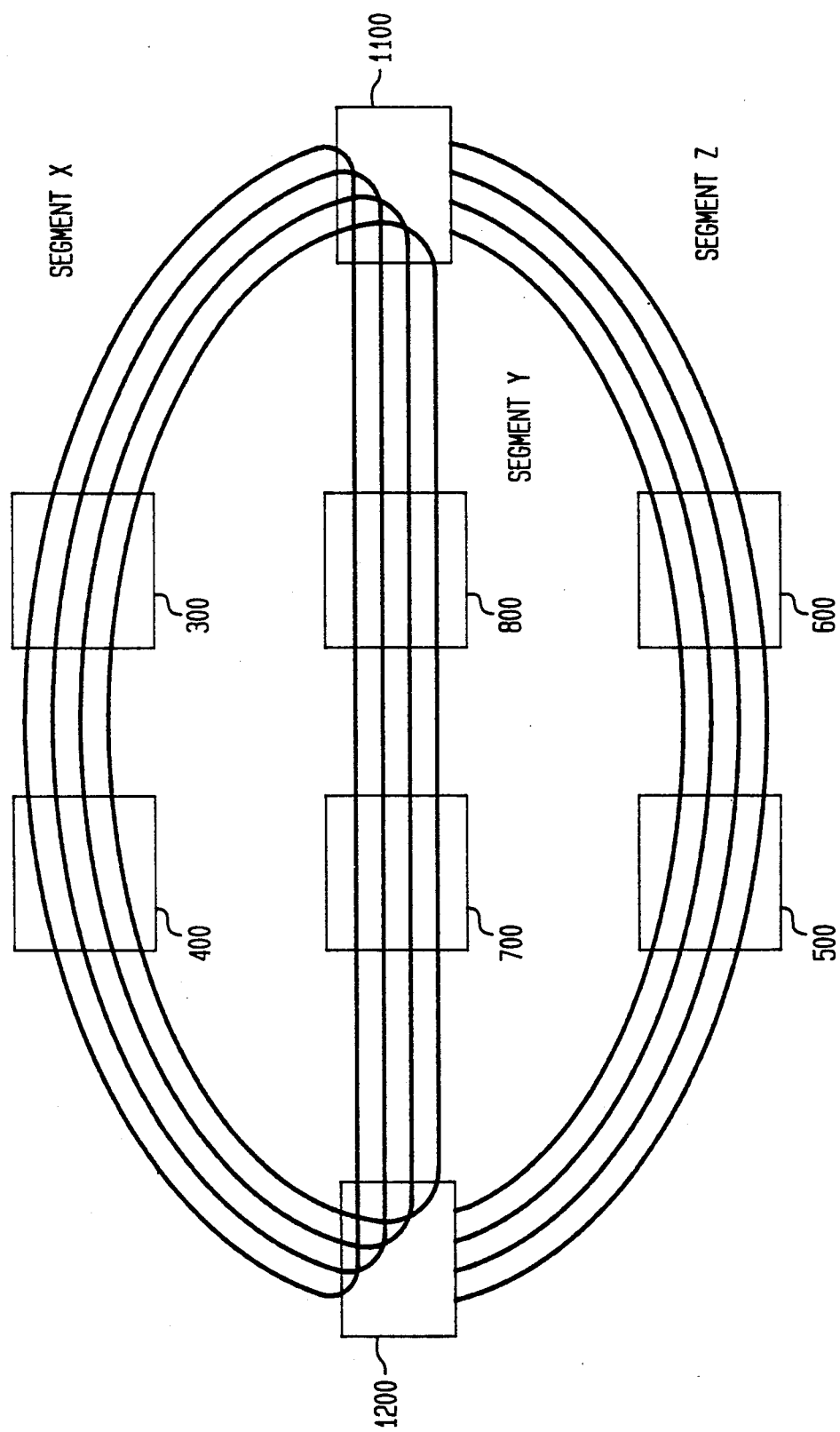
Figure 13:
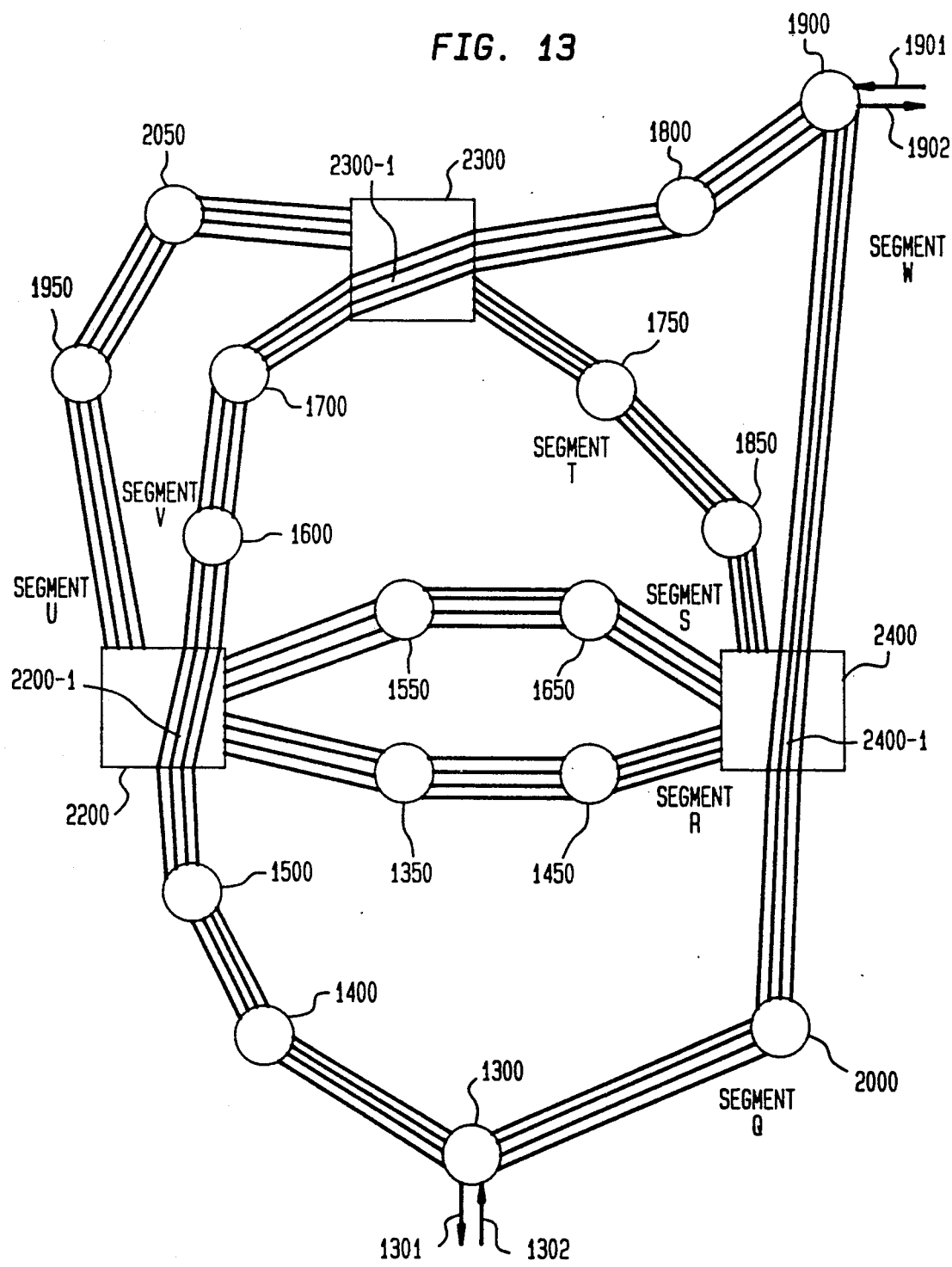
Figure 14:
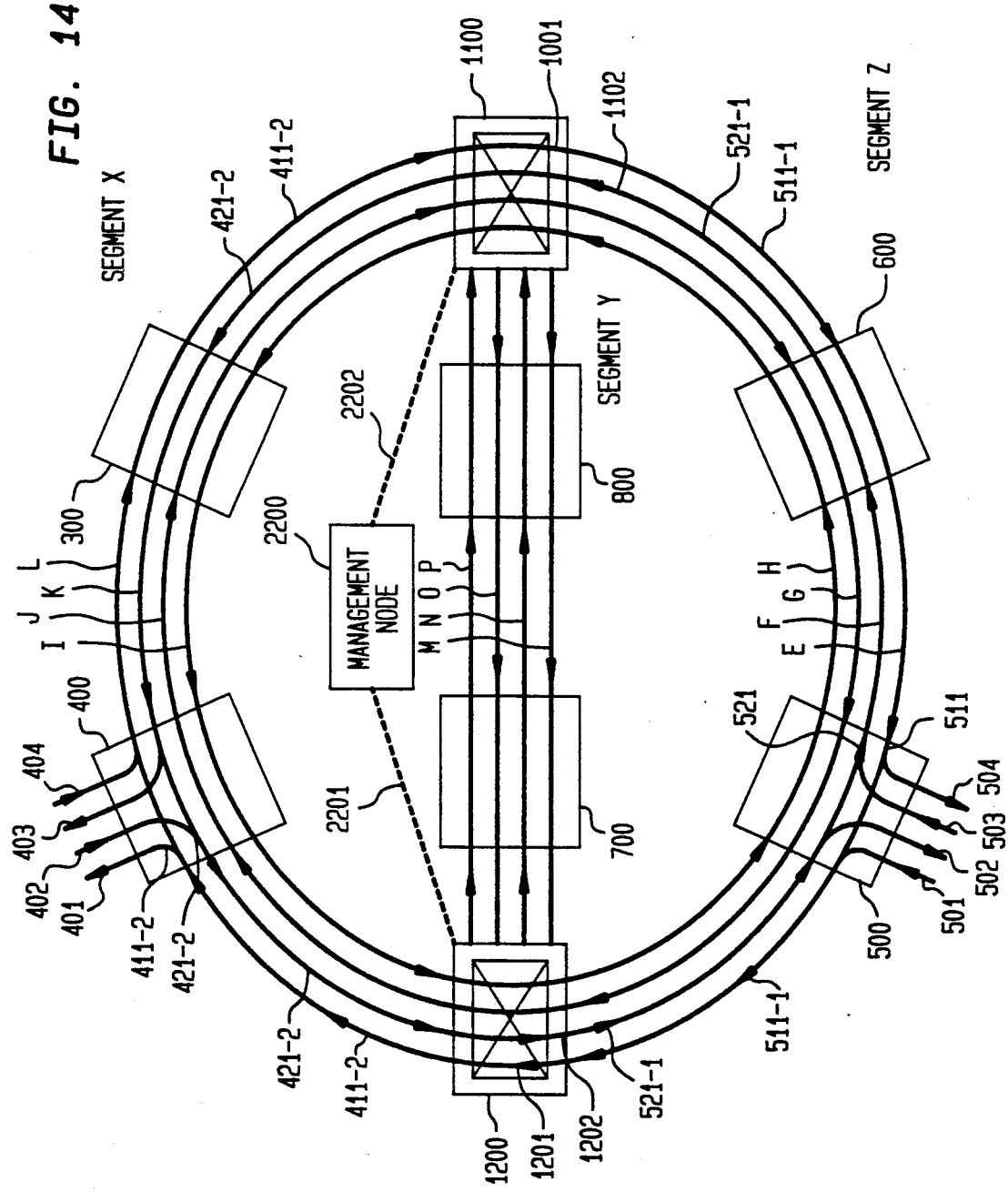

FIGS. 10-12 each depict different logical rings constructed from a three segment network interconnected by crossconnect nodes;

FIG. 13 shows a configuration of a bidirectional ring in a meshed network in accordance with my invention; and FIG. 14 depicts a management node for dynamically controlling the assignment of incoming subchannels to outgoing subchannels at crossconnect nodes.

6. DETAILED DESCRIPTION

Figure 1B:
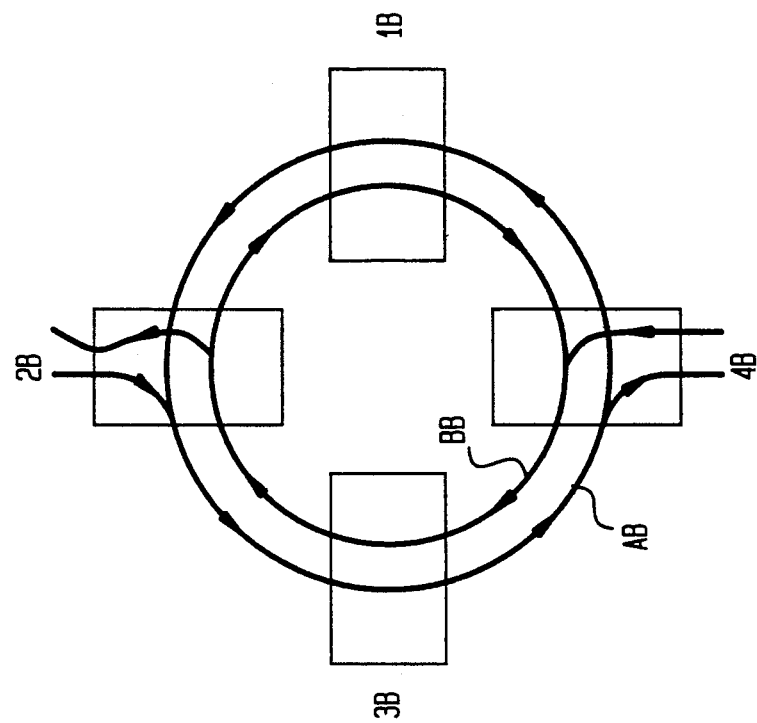
FIGS. 1A and 1B depict unidirectional and bidirectional ring networks structures, respectively, from the prior art.
Figure 1A:
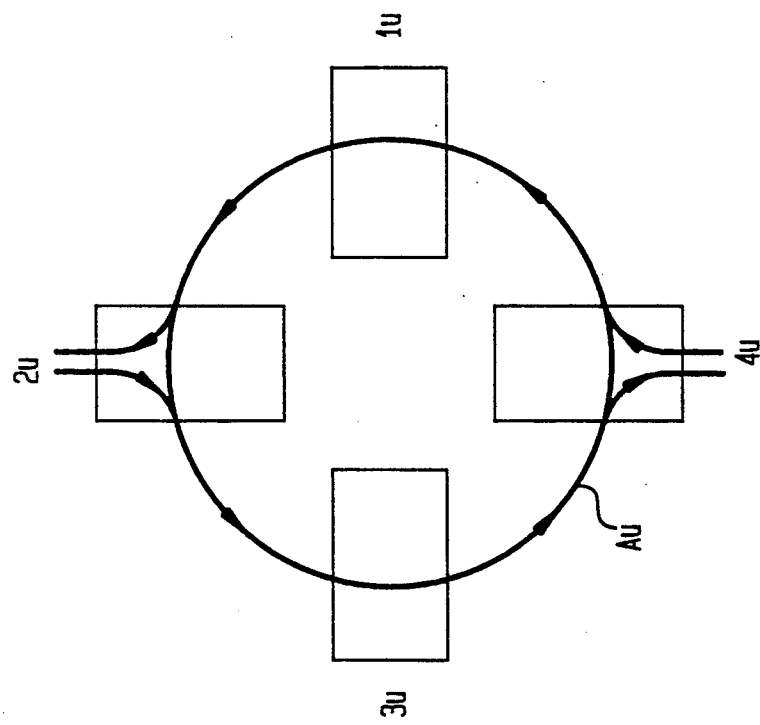

6.1 Detailed Description of the Prior Art 6.1.1 Unidirectional Versus Bidirectional Ring Networks Two distinct categories of self-healing ring networks are commonly referred to as unidirectional and bidirectional. Unidirectional networks, which are the structures upon which my prior patent application Ser. No. 07/577,219 is based, are characterized as having upstream and downstream information transported between nodes over opposite transmission routes, yet on the same transmission link. Therefore, as depicted in FIG. 1A, communication between nodes 2U and 4U entails transmitting from node 2U to 4U over link AU via node 3U, and transmitting from node 4U to 2U also over link AU, but via node 1U. Conversely, bidirectional ring networks, upon which my present invention is based, are characterized as having upstream and downstream information transported between nodes over the same transmission route but on two separate transmission links. Therefore, as shown in FIG. 1B, communication between nodes 2B and 4B entails transmitting from node 2B to 4B over link AB via node 3B and transmission from node 4B to 2B over link BB also via node 3B.

Figure 2B:
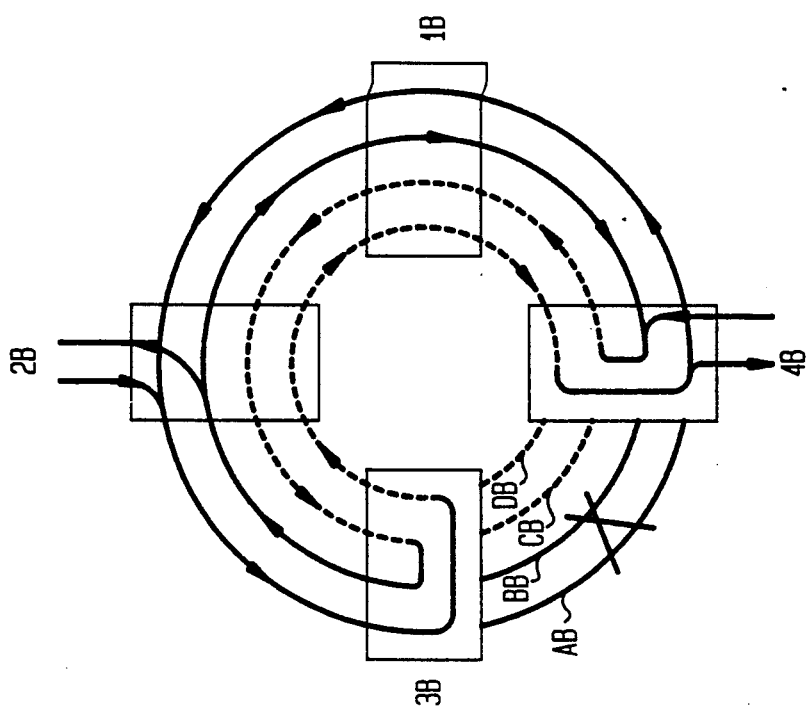
FIGS. 2A and 2B depicts from the prior art a general view of unidirectional and bidirectional self-healing networks, respectively, during a network failure or abnormal condition.
Figure 2A:
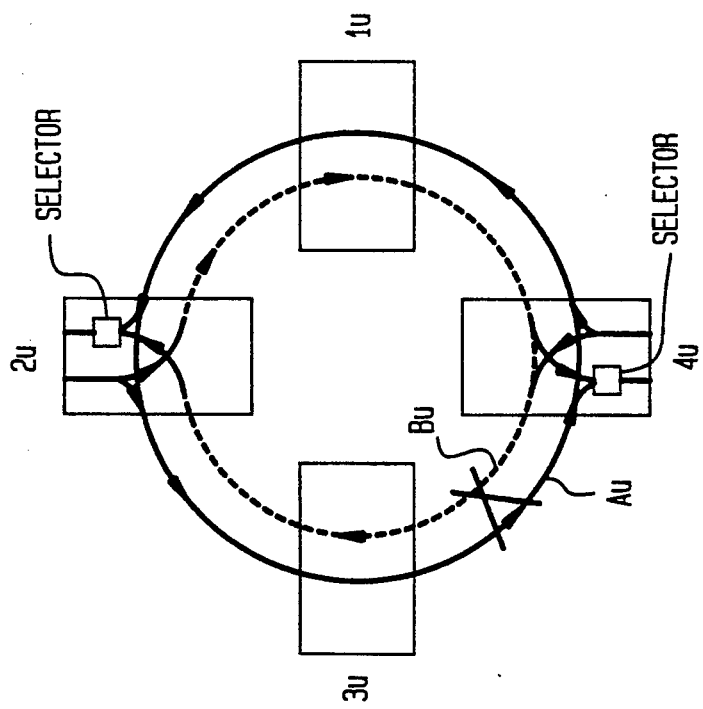

Unidirectional and bidirectional self-healing networks also differ in the survivability technique and number of protection links required to provide protection capability in the event of a break in the transmission link or a node failure. Unidirectional rings employ a duplicate transmission technique and one additional transmission link for protection. This technique entails transporting information destined for a network node over both the working and protection transmission links, yet over opposite routes. For example, as shown in FIG. 2A, transmission from node 2U to 4U is transmitted over the working link AU via node 3U, and a duplicate signal is sent simultaneously over the protection link BU via node 1U. Upon receiving both signals, destination node 4U selects the better of the two signals for processing. Similar signal duplication is performed at each network node. Therefore, in the event of a single network failure, communication between nodes on the network is maintained.

To ensure network survivability, bidirectional rings employ a loop-back technique and two additional protection transmission links (CB and DB in FIG. 2B) which remain unused under normal operation. Upon detecting a failure, the nodes adjacent to the failure switch the working links onto the protection transmission links and re-route traffic to its destination node over the protection link, thereby looping around the network failure location. In the case of a break in links AB and BB between nodes 3B and 4B, as shown in FIG. 2B, nodes 3B and 4B switch working link AB onto protection link DB and working link BB to protection link CB. Other nodes do not perform any such switching functions.

Although unidirectional and bidirectional networks are distinct structures employing different numbers of transmission links and different self-healing techniques, communication between nodes in both networks is accomplished in a similar fashion which results in similar drawbacks and limitations. Specifically, information being communicated between nodes is transported in a subrate multiplexed signal structure. This signal structure is composed of a fixed number of multiplexed subchannels. Subchannels operate at fixed rates and are used to transport information between pairs of network nodes. The multiplexed signal is demultiplexed at each network node into subchannels. Subchannels destined for that node are forwarded to receiving equipment within the node; other subchannels destined for other nodes are combined with subchannels originating at the node; and the total signal of multiplexed subchannels is passed on to an adjacent network node.

Since all links and nodes in both unidirectional and bidirectional networks transport the same signal structure of multiplexed subchannels, all nodes and links are required to have the transmission capacity to operate at the total rate of the multiplexed signal, thus imposing a high bandwidth requirement upon network nodes and links. In my prior application, a unidirectional ring network employed crossconnect nodes to configure unidirectional ring networks as a cascade of pre-determined segments. A logical ring is therefore formed composed of independent segments (each containing a subset of network nodes) which are interconnected at the subchannel level by crossconnect nodes such that each segment can operate at a different rate, can have a different signal structure, and can contain a different number of subchannels.

Application of the basic aspects of this approach to remedy similar deficiencies of bidirectional self-healing ring networks has potential; however, given the structural and operational distinctions between unidirectional and bidirectional ring networks, the circuitry described in my prior application will not resolve the limitations and deficiencies of bidirectional self-healing networks. Specifically, implementation of this approach in bidirectional networks would require crossconnects that are functionally and structurally distinct from those described in my prior application. Instead, in accordance with my present invention, bidirectional self-healing ring networks are configured as segments interconnected at the subchannel level by crossconnect nodes having loop-back capabilities to form logical ring networks. However, prior to a further description of my present invention, a further detailed discussion of the network nodes and of the operation of bidirectional self-healing ring networks is presented.

6.1.2 Conventional Bidirectional Ring Operation—Prior Art

The operation of bidirectional ring networks has been described in the literature in "Self-Healing Fibre Optic Rings for SONET Networks", Contribution T1X1.5-046, to T1M1/T1X1 Ad Hoc Committee, October 1988, by I. Hawker, et al. The discussion of the operation of conventional bidirectional ring networks entails separate discussions of the operation of a single Add-Drop Multiplex node (hereafter ADM) and the operation of multiple ADMs connected in tandem, both under normal and failure conditions.

6.1.2.1 ADM Under Normal Operation

Figure 3:
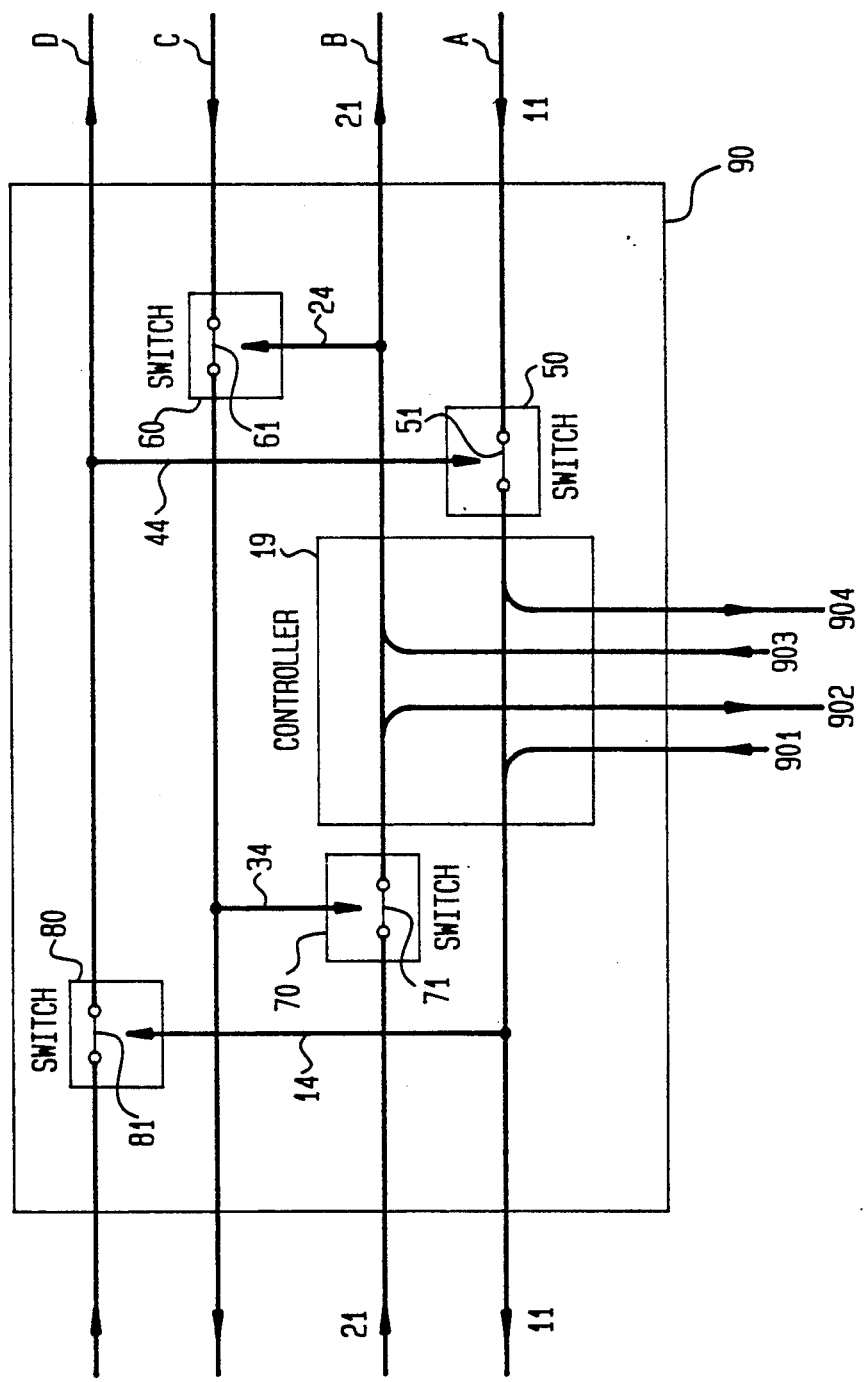
FIG. 3 shows a prior art Add-Drop Multiplex node (ADM) located on a bidirectional ring structure under normal operation.

FIG. 3 depicts an ADM 90 under normal operation. The ADM 90 has four unidirectional links A, B, C, and D, passing through it, where only links A and B are working during normal operation and links C and D are for protection and used to carry traffic only in the event of a network failure. Links A and C transport information through ADM 90 in one direction and links B and D in the opposite direction.

Under normal operation, multiplexed signals 11 and 21 are received at ADM 90 over links A and B, respectively. ADM 90 allows adding and dropping of subchannels from received multiplexed signals 11 and 21. Received signal 11 passes through switch 50 via line 51, and subchannels to be extracted are accessed by controller 19 and dropped. Signal 904 may contain one or more such dropped subchannels. Then subchannels from signal 901 to be inserted at the node are added to signal 11. After all add-drops, signal 11 leaves the node and is simultaneously sent to switch 80 via line 14 for ready transport on link D should a network failure occur. Similarly, received multiplexed signal 21, after connection through switch 70 via line 71 and after all drops (to signal 902) and insertions (from signal 903) at the ADM 90, exits the node and is simultaneously sent to switch 60 via line 24.

Under normal operation, links C and D are inactive, thus passing signals carrying no information; therefore, these idle signals on links C and D simply pass through switches 60 and 80, respectively, of ADM 90 with possible regeneration. The signal structure maintained over links C and D is similar to signals 11 and 21, respectively, except that no subchannels are added or dropped. Signals 901 and 902 provide two-way communication between ADM 90 and an ADM using the left side of the network. Signals 904 and 903 also provide two-way communication but between ADM 90 and an ADM using the right side of the network.

6.1.2.2 ADM Operation Under Failure Conditions

ADM 90 can sense failure on the received active signals 11 and 21, and, upon detecting a failure on one or both active signals, the switches in ADM 90 are triggered to provide loop-back capabilities. Examples of failures or abnormal conditions that trigger operation of the loop-back switches are total loss of signal (e.g. cable cut), error signal (indicating failure at an upstream node such as a regenerator) or a signal impairment preventing subchannel identification for the received signal. Also, a received far-end-receive-failure indication indicating failure detection by the connected ADM can trigger loop-back switch operation. Alternatively, codes or messages propagated around the ring can trigger loop back.

Generically, under failure or similar abnormal conditions, a signal to be transmitted from the ADM is looped back in its entirety and substituted for a received signal. Loop-backs occur through operation of switches on the side of the ADM adjacent to the failure. When a loop-back switch is triggered, an active signal path (working link A or B) is connected to an inactive signal path (protection link D or C, respectively). Active and inactive signal paths are connected such that subchannels being dropped or inserted at the ADM are not lost due to loop-back operation during network failure. The loop-back switches can switch electrical or optical signals and can be mechanical, electro-mechanical, electronic or optical.

Figure 4A:
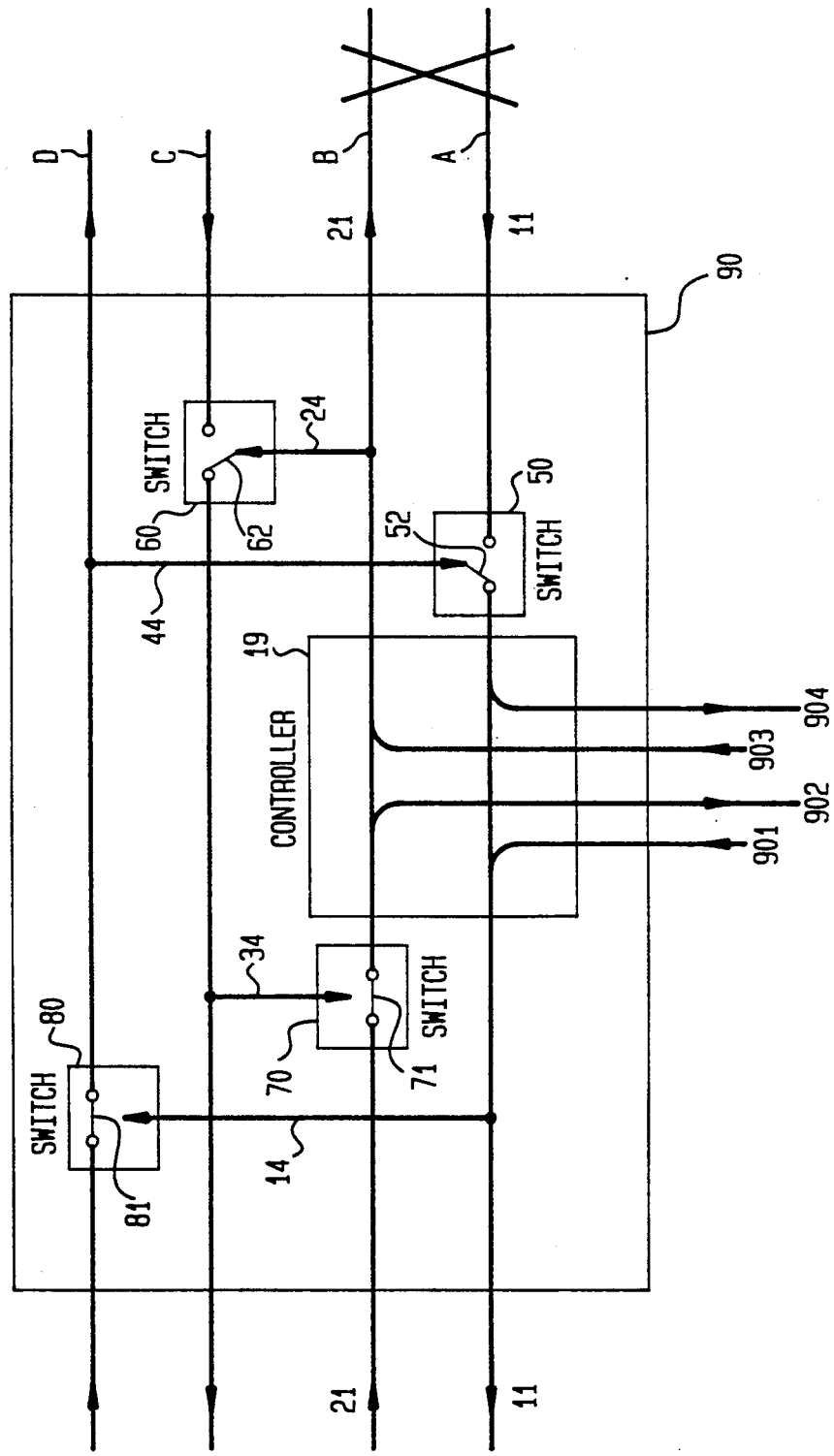
FIGS. 4A and 4B depict prior art ADM loop-back switch operations for a bidirectional ring structure under failure conditions adjacent to the right and left of the ADM, respectively.

FIG. 4A depicts the operation of ADM 90 during a failure on its right side. This failure inhibits receipt of signal 11 and/or transmission of signal 21. Upon detection of such a failure by ADM 90, switches 50 and 60 become operational. As a result, link 44 is connected to link 52 thus allowing links A and D to be connected, and signal 11 to be looped back around the failure. Similarly, link C is connected via links 62 and 24 to link B such that signal 21 is looped around the failure.

Figure 4B:
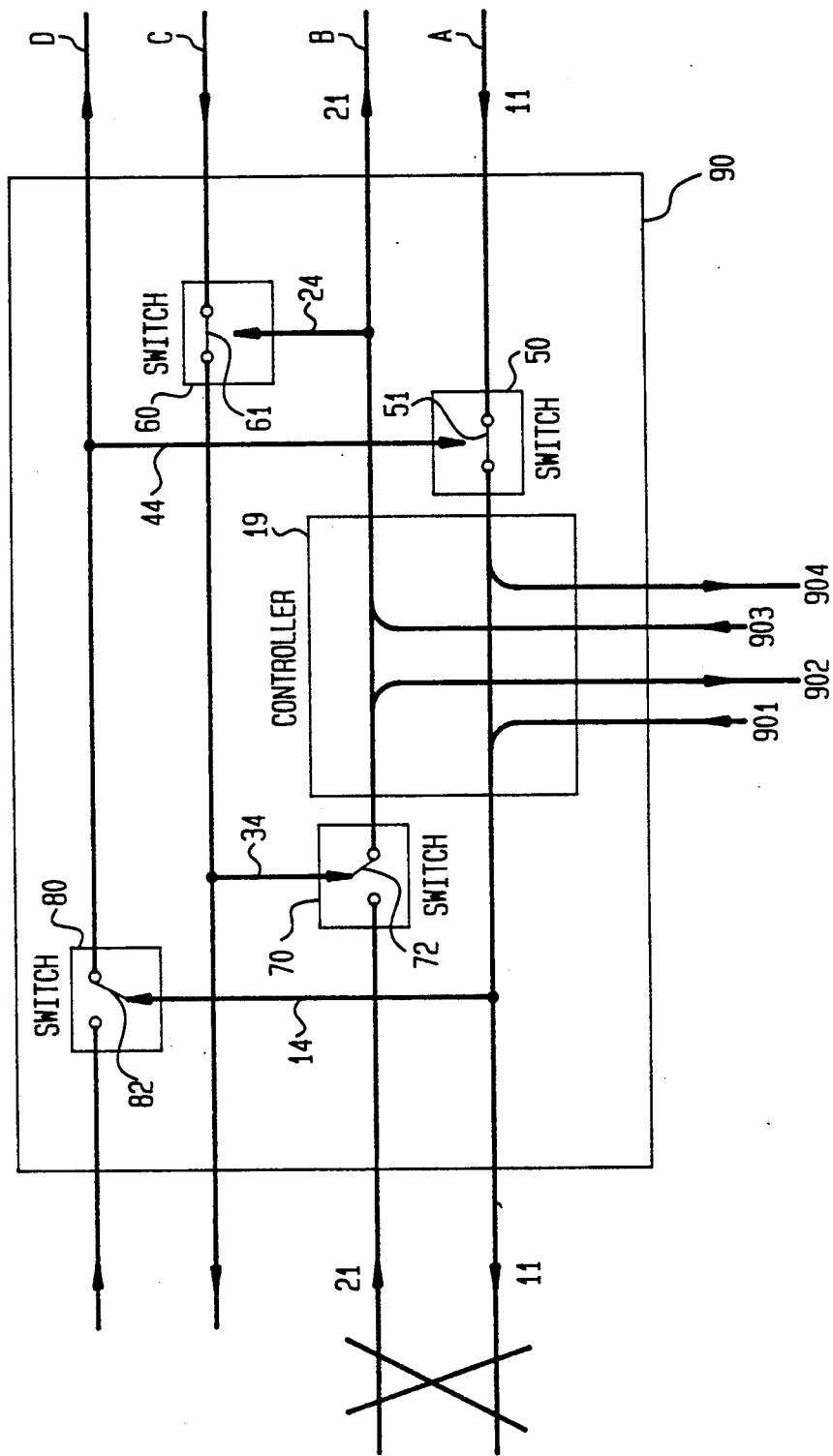

During a failure on the right side of ADM 90, switches 70 and 80 retain their normal settings. However, as shown in FIG. 4B, failure to the left of ADM 90 causes switches 70 and 80 to become operational. Link A is switched to link D via links 14 and 82, link B is switched to link C via links 34 and 72 such that signals 11 and 21, respectively, are looped back around the failure. In this case, as shown in FIG. 4B, switches 60 and 50 retain their normal settings.

6.1.2.3 Bidirectional Ring Network Under Normal Conditions

Figure 5A:
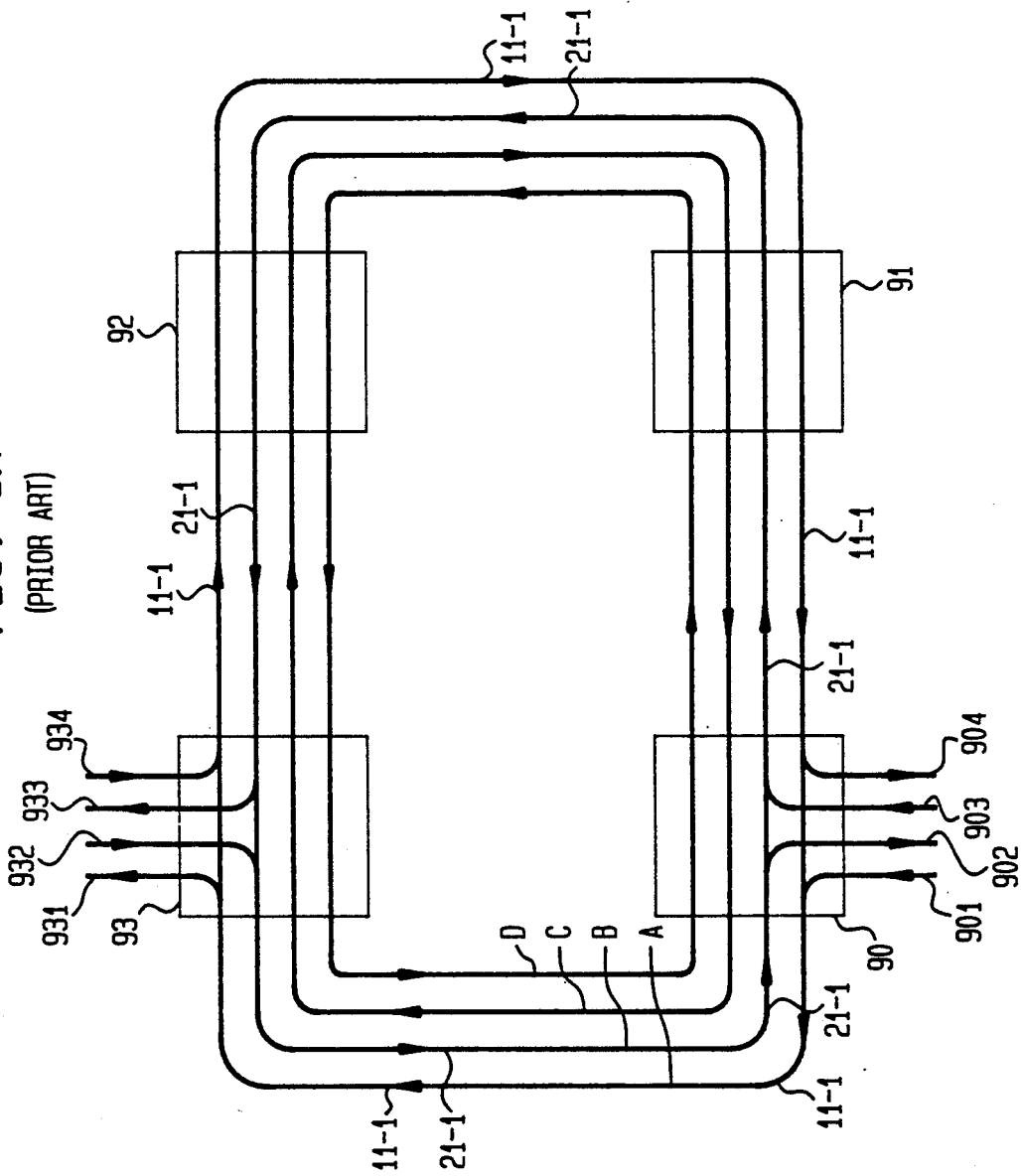
FIGS. 5A and 5B show a prior art bidirectional ring structure under normal and failure conditions, respectively.
Figure 5B:
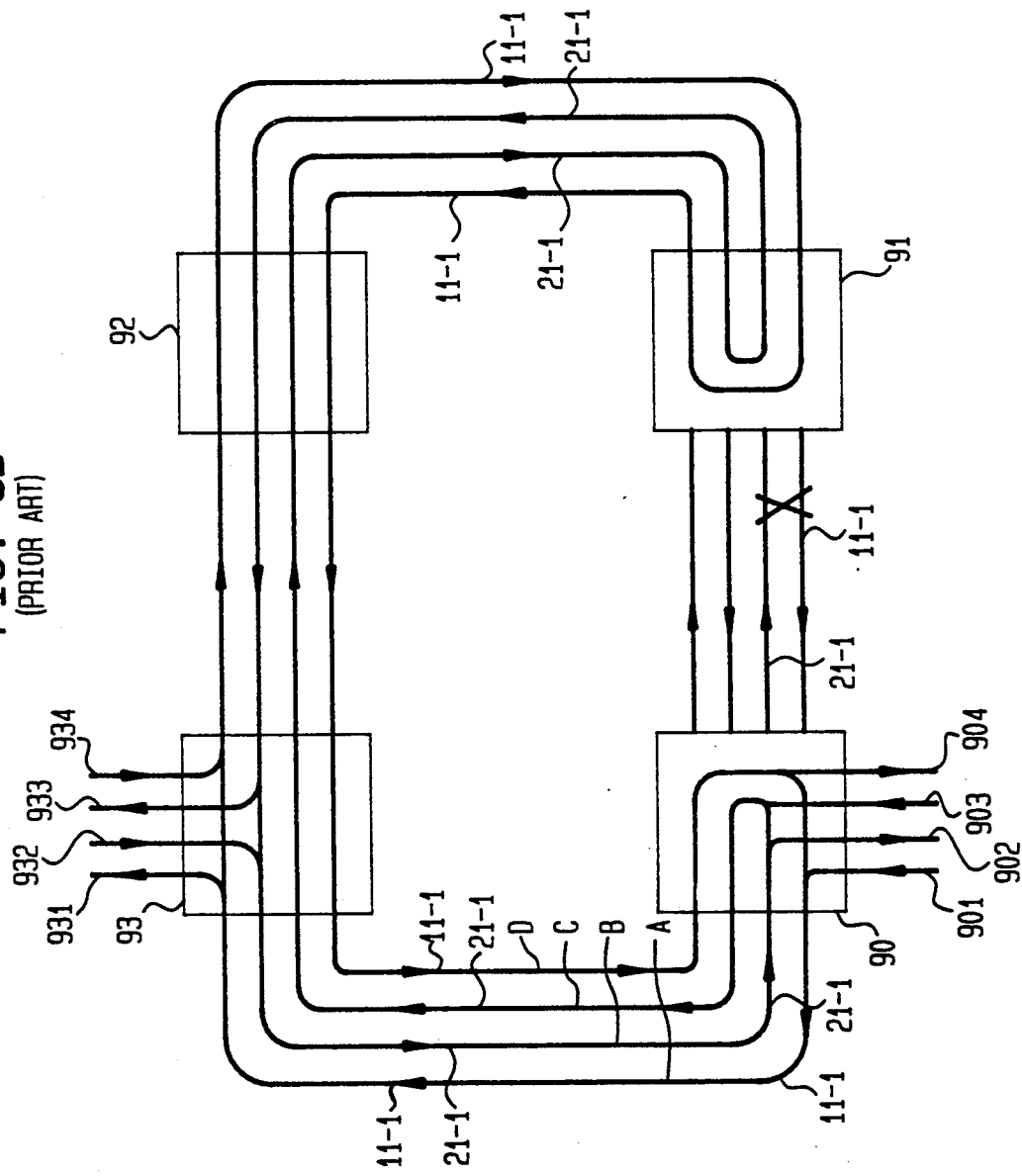

Multiple ADMs, which function as shown in FIGS. 3, 4A and 4B, can be connected in a conventional bidirectional self-healing ring network as shown in FIGS. 5A and 5B. Under normal operating conditions, all switch settings in all ADMs will be as shown in FIG. 3. The outer two links A and B carry active signals, and the inner two links C and D, under normal conditions do not carry any information between nodes. To demonstrate two-way communication between ADMs in a bidirectional ring network, communications between ADMs 90 and 93 and ADMs 90 and 92 are illustratively described. To simplify the following discussion, switches have not been shown.

Two-way communication between ADMs 90 and 93 as shown in FIG. 5A is accomplished via signals 11 and 21 transported on links A and B, respectively, and subchannel 1 has been illustratively designated for carrying information between these nodes. At ADM 90, signal 901, which is to be transported to signal 931 at ADM 93, is input into subchannel 1 of signal 11 (subchannel 11-1), and signal 11 comprised of all multiplexed subchannels transported on link A is propagated to ADM 93. At ADM 93, subchannel 11-1 is extracted as signal 931. Similar operation occurs as information is transported from signal 932 at ADM 93 via subchannel 21-1 to signal 902 at ADM 90.

Notedly, signals 901, 902, 931 and 932 passed between ADMs 90 and 93 on the left portion of the ring are associated with the same subchannel, illustratively subchannel 1, within multiplexed signals 11 and 21. Thus, signals 901 and 932 are connected via subchannels 11-1 and 21-1 to signals 931 and 902, respectively. Similarly, for communication between ADMs 90 and 93, signals 903 and 934 are connected via subchannels 21-1 and 11-1 to signals 933 and 904, respectively, still using links A and B since different parts of the links A and B are being used. Specifically, signal 934 is connected to signal 904 via subchannel 11-1 passing through ADMs 91 and 92. Similarly, signal 903 is connected to signal 933 via subchannel 21-1 passing through ADMs 91 and 92.

For simplicity of discussion and illustration, subchannels 11-1 and 21-1 are used to transport traffic between ADMs 90 and 93 on both the left and right sides of the network. However, either side of the network could have been used to transport traffic between a different pair of network ADMs. For example, instead of using subchannels 11-1 and 21-1 on the right side of the network to transport information between ADMs 90 and 93, these subchannels could have been used to transport information between ADMs 90 and 92 via ADM 91. In such case, subchannels 11-1 and 21-1 can also be used to carry information between ADM 92 and 93 since over this portion of links A and B these subchannels would not be used for communication between ADMs 90 and 93 or ADMs 90 and 92.

Clearly, the same subchannels can be used for communicating between different ADMs on a bidirectional ring provided that each pair of ADMs utilizing the same subchannel does so at non-overlapping sections of the ring. Therefore, subchannels 11-1 and 21-1 can be used to carry information between ADMs 93 and 90, ADMs 90 and 92 and ADMs 92 and 93 since the usage of the subchannel 1 by these pairs of nodes is non-overlapping.

Other subchannels of the multiplexed signals 11 and 21 are used to carry information between one or more pairs of ADMs. All multiplexed signals propagating around the ring between ADMs have the same subchannel structure and operate at the same fixed rate. Therefore, all ADMs and links in the bidirectional network must also operate at the rate of the multiplexed signals.

6.1.2.4 Bidirectional Ring Operation Under Failure Conditions

In the event of a link failure such as a cable cut between ADMs 90 and 91, these ADMs detect the failure and trigger operation of loop-back switches, the effects of which are shown in FIG. 5B. Since the failure occurs on the right side of ADM 90, switch settings for ADM 90 will be as those shown in FIG. 4A. Since the failure occurs on the left side of ADM 91, switch settings for ADM 91 will be as shown in FIG. 4B. Other switch settings are unaffected by the failure. In summary, loopbacks and changes in switch settings occur for ADMs adjacent to the failure. As a result of the loop-back operation at ADMs 90 and 91, the inner two links C and D now carry traffic to circumvent the failure.

Communication paths between ADMs 90 and 93 (e.g. between signals 901 and 931) on the left side of the ring via signals 11 and 21 are not affected by this rearrangement; however, communication paths between these ADMs (e.g. between signals 903 and 933 and signals 904 and 934), via signals 11 and 21 on the right side of the ring, which traverse the failure location, will be affected. Similarly, communication paths between any network nodes are not affected if the paths traversed by signals carrying information between nodes do not pass through the failure location. Furthermore, signals carrying information between network nodes whose paths traverse the failure location will be affected, and these signals will be looped back to inactive links. However, regardless of where the failure occurs, the pre-assigned subchannels are not affected.

For example, as shown in FIG. 5B, communication between ADMs 90 and 93 that normally passes through ADMs 91 and 92 now follows a more complicated path due to the network failure. Working links A and B are connected to protection links D and C, respectively. These link connections are established at both ADMs 90 and 91 at the switches adjacent to the network failure. Specifically, signal 11, normally traversing link A from ADM 91 to 90 is looped back at ADM 91, and propagates on link D passing through ADMs 92 and 93. At ADM 90, signal 11 is again looped back from link D to link A, and propagates as under normal operating conditions. Signal 21, normally traversing link B from ADM 90 to 91, is similarly looped back from link B to link C to circumvent the failure.

As a result, signal 934 of ADM 93 is now connected to signal 904 of ADM 90 still using subchannel 1 over a path consisting of protection link D and working link A. Likewise, signal 903 of ADM 90 is now connected to signal 933 of ADM 93 over a path consisting of protection link C and working link B also, still using subchannel 1.

If an ADM fails, instead of a link failure, the network loop-back operation would be very similar to that described above. If an ADM fails, the two ADMs adjacent to the failed ADM (one on each side of the failed ADM) loop back to maintain communications between the remaining working nodes. Thus, communication over the ring is fully maintained under failure of working communication paths A and B or under an ADM failure.

A drawback of conventional bidirectional networks is that all fixed rate subchannels are multiplexed forming a high bandwidth signal structure that must be accommodated by all links and ADMs in the network. As a result, accommodating this high bandwidth multiplexed signal structure proves costly. In addition, once the capacity of existing facilities is exhausted, meeting additional bandwidth requests from any node would require that all transmission links and nodes be upgraded, which would be cost-prohibitive. Another problem with rings is interconnection of multiple rings. Furthermore, synchronization of ring operation is complicated, especially under failure condition and when multiple rings are interconnected.

6.2 Detailed Description of the Present Invention

These and other difficulties and limitations encountered in using conventional bidirectional ring networks are alleviated in accordance with the present invention by partitioning the network into segments using crossconnect nodes, thus resulting in a more flexible physical structure. Pursuant to this invention, segments are interconnected at the subchannel level by crossconnect nodes such that the logical ring structures are preserved. In partitioning the network into multiple segments interconnected by crossconnects, greater flexibility is afforded in the network to accommodate additional bandwidth requests between ADMs, since spare bandwidth can be shared among different segments.

Each segment extends between a pair of crossconnect nodes and is independent of other network segments. Furthermore, different segments can operate at different total multiplexed rates and can have different signal structures comprising a different number of subchannels. Since segments are totally independent, different subchannels may be designated on different segments to transport information between two ADMs. Therefore, in the case where a communication path between two nodes consists of more than one segment, the subchannels designated on each independent segment may be different contrary to conventional bidirectional ring networks in which the same subchannel over the communication path between two ADMs is designated for transporting traffic between these ADMs.

Each segment consists of one to a plurality of ADMs and four links passing through the ADMs. As a special case (not shown), a segment may not contain any ADMs. The ADMs operate substantially the same as described above in subsections 6.1.2.1 and 6.1.2.2. Furthermore, as described previously for conventional bidirectional ring networks, two links of a segment are working and two are protection.

FIG. 6A shows an embodiment of a bidirectional self-healing network in accordance with my invention consisting of three independent network segments where each segment contains two ADMs. ADMs 500 and 600 and links E, F, G, and H extending between crossconnect nodes 1100 and 1200 form a first segment Z; ADMs 300 and 400 and links I, J, K, and L extending between crossconnect nodes 1100 and 1200 form a second segment X; and ADMs 700 and 800 and links M, N, O, and P extending between crossconnect nodes 1100 and 1200 form a third segment Y.

6.2.1 Crossconnect Node Operation

Figure 7:
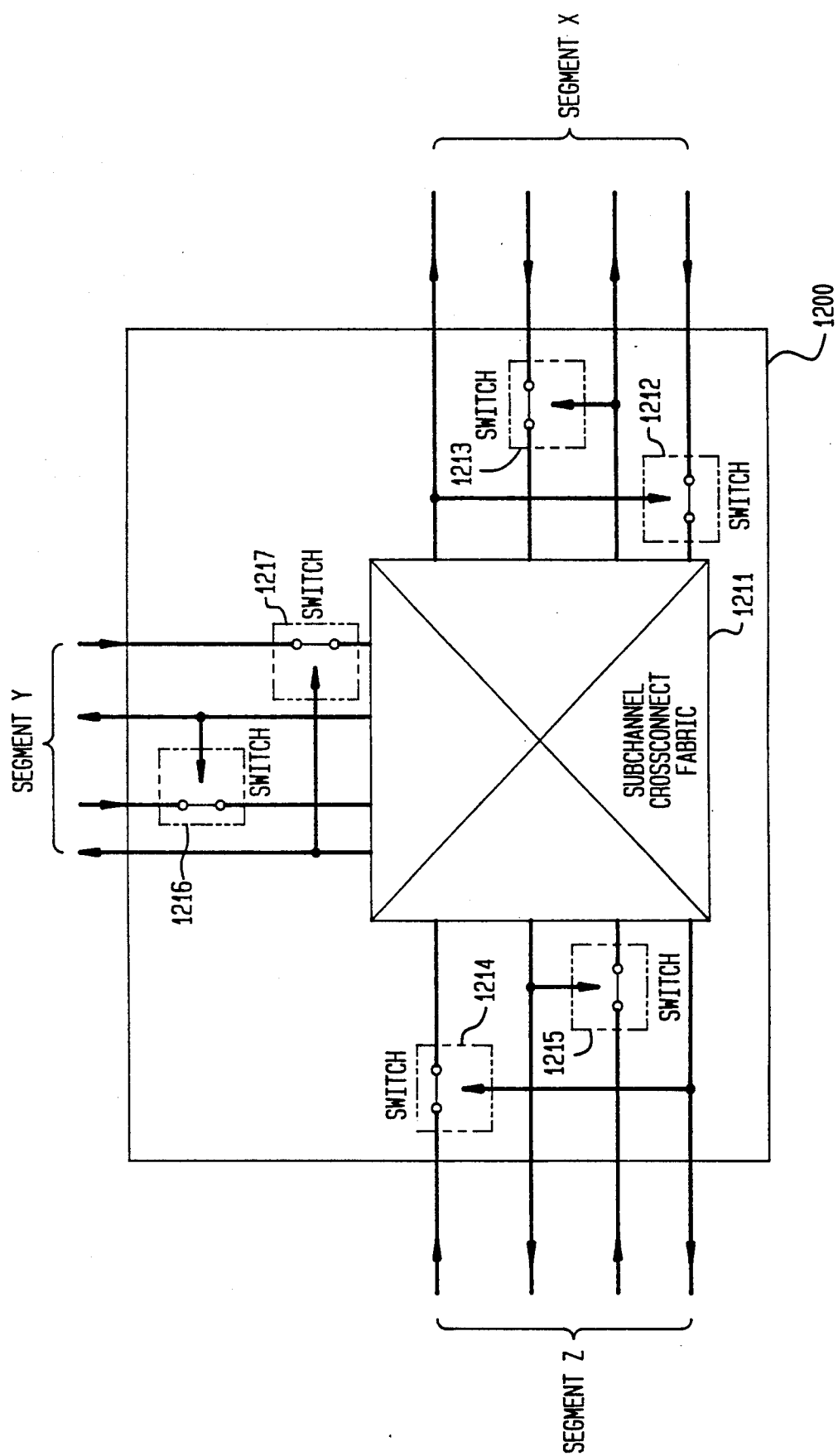
FIG. 7 depicts a crossconnect node during normal operation in accordance with an illustrative embodiment of my invention.

As stated, each segment is terminated on two crossconnect nodes 1100 and 1200. Generically, a crossconnect node as shown in FIG. 7 and more fully described in Technical Reference TR-TSY-000233, Bell Communications Research, Inc., Issue 2, September 1989, interconnects a given incoming subchannel to another predetermined out-going subchannel. Subchannel crossconnections are established by the crossconnect node only between subchannels propagating on two working links or between subchannels propagating on two protection links.

In addition, as shown in FIG. 7, crossconnect node 1200 has loop-back switches 1212-1217, two for each segment terminated at the crossconnect node, and these switches operate substantially the same as switches in ADMs described previously. Therefore, a crossconnect node can loop back signals within each terminated segment in response to a detected failure as does an ADM. Furthermore, subchannels can be dropped and inserted (not shown) at the crossconnect nodes in a manner similar to the drops and insertions at ADM nodes while maintaining the logical-ring structure described in Section 6.2.2.

As shown in FIG. 7, prior to an incoming multiplexed signal being terminated at the crossconnect fabric 1211, the signal is passed through a loop-back switch; however, upon a failure being detected that is adjacent to the crossconnect node, affected signals are looped-back after being crossconnected at node 1200. Performing crossconnections prior to loop-backs allows subchannels not connecting to subchannels that traverse the failure location to avoid unnecessary loop-back as demonstrated in FIG. 6B. All crossconnect nodes have similar structure as described above for crossconnect node 1200 and operate similarly.

6.2.2 Network Operation Under Normal Conditions Between Segments X and Z

Normal operation of a bidirectional network in accordance with an illustrative embodiment of my invention is shown in FIG. 6A. Illustratively, communication between signals 501 and 502 at ADM 500 and signals 401 and 402 at ADM 400, respectively, is described below. Signal 501 inserted at ADM 500 into subchannel 511-1 propagates to crossconnect 1200. Crossconnect 1200 interconnects 511-1 to subchannel 411-2 via line 1201. Subchannel 411-2 is dropped as signal 401 at ADM 400. Similarly, signal 402 is inserted into subchannel 421-2, interconnected via line 1202 at crossconnect 1200 to subchannel 521-1 and finally dropped as signal 502 at ADM 500.

Similarly, signals 403 and 404 at ADM 400 are connected to signals 503 and 504, respectively, at ADM 500 via crossconnect node 1100, but using the opposite side of the network. Signal 503 is inserted into subchannel 521-1, crossconnected at node 1100 via link 1102 to subchannel 421-2 and dropped at ADM 400 as signal 403. Similarly, signal 404 is inserted into subchannel 411-2, crossconnected via line 1101 to subchannel 511-1 and dropped at ADM 500 as signal 504. Thus, a subchannel number on one segment is not necessarily crossconnected to the same subchannel number on a different segment to establish communications paths between two ADMs.

Notably, at crossconnect nodes 1200 and 1100, subchannel 2 within each signal on segment X is interconnected to the subchannel 1 within each signal on segment Z to form a logical ring as shown in FIG. 6A. This ring is called a logical ring as distinguished from the physical ring taught in the prior art. The crossconnect nodes can connect arbitrary pre-determined subchannels on different segments to form logical rings. The same subchannels can be used for communications between different ADMs on a logical ring provided that each pair of ADMs utilizing the same subchannels does so at non-overlapping sections of the logical ring.

6.2.3 Network Operation Under Failure Conditions between Segments X and Z

FIG. 6B shows how communication among ADMs on segments X and Z is maintained under failure conditions where illustratively a break in the link occurs between crossconnect 1200 and ADM 500. Upon detecting this failure, ADM 500 performs loop-back operation similar to those described above for ADM 91 shown in FIG. 5B. Furthermore, crossconnect 1200 performs loop-back operation similar to ADM 90 also shown in FIG. 5B. As a result of the loop-back operation, links E and H and links F and G of segment Z are connected. Therefore, signals 511 and 521 are permitted to propagate around the network failure.

Specifically, subchannel 421-2 entering crossconnect 1200 is crossconnected via link 1202 to subchannel 521-1. Then, signal 521 is looped back from working link F to protection link G, and subchannel 521-1 crossconnected to subchannel 421-2 via 1203, but propagated over protection link J of segment X. At crossconnect node 1100, subchannel 421-2 is crossconnected via 1103 to subchannel 521-1, as at crossconnect node 1200, but onto protection link G. Signal 521 is subsequently looped back at ADM 500 and propagated on link F as under normal operation. As previously indicated, subchannel 421-2 is crossconnected at node 1200 prior to signal 521 being looped back such that subchannels intended for segment Y, thus not traversing the failure location, avoid unnecessary loop back. However, subchannel assignments at each crossconnect node between segments are unaffected by the loop-back operation.

During loop-back operation crossconnect 1200 maintains its pre-selected pattern of interconnections between segment subchannels. Furthermore, switch settings at ADMs 300, 400, 600, 700 and 800 and crossconnect 1100 are unaffected by the failure; therefore, these nodes do not re-route signals passing through them.

6.2.4 Network Operation Under Normal Conditions between Segments Y and Z

FIG. 8A illustratively depicts communication between ADMs 500 and 700 of segments Z and Y, respectively. Specifically, communication between signals 505 and 506 at ADM 500 and signals 701 and 702 at ADM 700, respectively, is described below.

As shown in FIG. 8A, signal 505 is inserted into subchannel 511-2 and is propagated to crossconnect 1200. Crossconnect 1200 interconnects subchannel 511-2 to subchannel 711-1 via line 1205. Similarly, signal 702 is inserted into subchannel 721-1 and propagated to crossconnected 1200. At crossconnect 1200, subchannel 721-1 is crossconnected via line 1206 to subchannel 521-2 and finally dropped as 506 at ADM 500. Similar operation occurs via crossconnect 1100 to support communication between signals 507 and 508 of ADM 500 and signals 703 and 704 of ADM 700. Notedly, subchannel 1 of signals traversing links M, N, O, and P of segment Y are interconnected by crossconnect nodes 1200 and 1100 to subchannel 2 of signals traversing links H, G, F, and E of segment Z to form the logical ring shown in FIG. 8A.

6.2.5 Operation Under Failure Conditions between Segments Y and Z

A break in links E, F, G, and H, as shown in FIG. 8B, will affect communication between ADMs 500 and 700. Since this failure occurs between crossconnect 1200 and ADM 500, these nodes will loop back signals in the same manner as described above in Section 6.2.3 and as shown in FIG. 6B, and the communication between ADMs 500 and 700 will be maintained as shown in FIG. 8B.

FIG. 8B differs from FIG. 6B only in that different logical rings are formed by the interconnection at the subchannel level of different pairs of ADMs located on different segments. In FIG. 6B, ADM 500 of segment Z and ADM 400 of segment X are interconnected, and in FIG. 8B, ADM 500 of segment Z and ADM 700 of segment Y are interconnected. However, the loop-back operation at ADM 500 and crossconnect node 1200 is the same in both figures.

Similarly, in both FIGS. 6B and 8B, loop-back switching is performed at crossconnect 1200 after the crossconnection of subchannels is performed. Furthermore, in both figures, switch settings at all nodes non-adjacent to the network failure are unaffected, and, similarly, paths of those signals that do not transverse the failure location are also unaffected by loop back at crossconnect 1200 and ADM 500.

6.2.6 Bandwidth Sharing Flexibility

In accordance with an aspect of my invention, implementing crossconnects to interconnect segments at the subchannel level helps to resolve bandwidth limitations that are characteristic of bidirectional ring networks of the prior art. The following discussion with reference to FIG. 9 demonstrates how my invention affords bandwidth flexibility to meet bandwidth upgrade requests.

Figure 9:
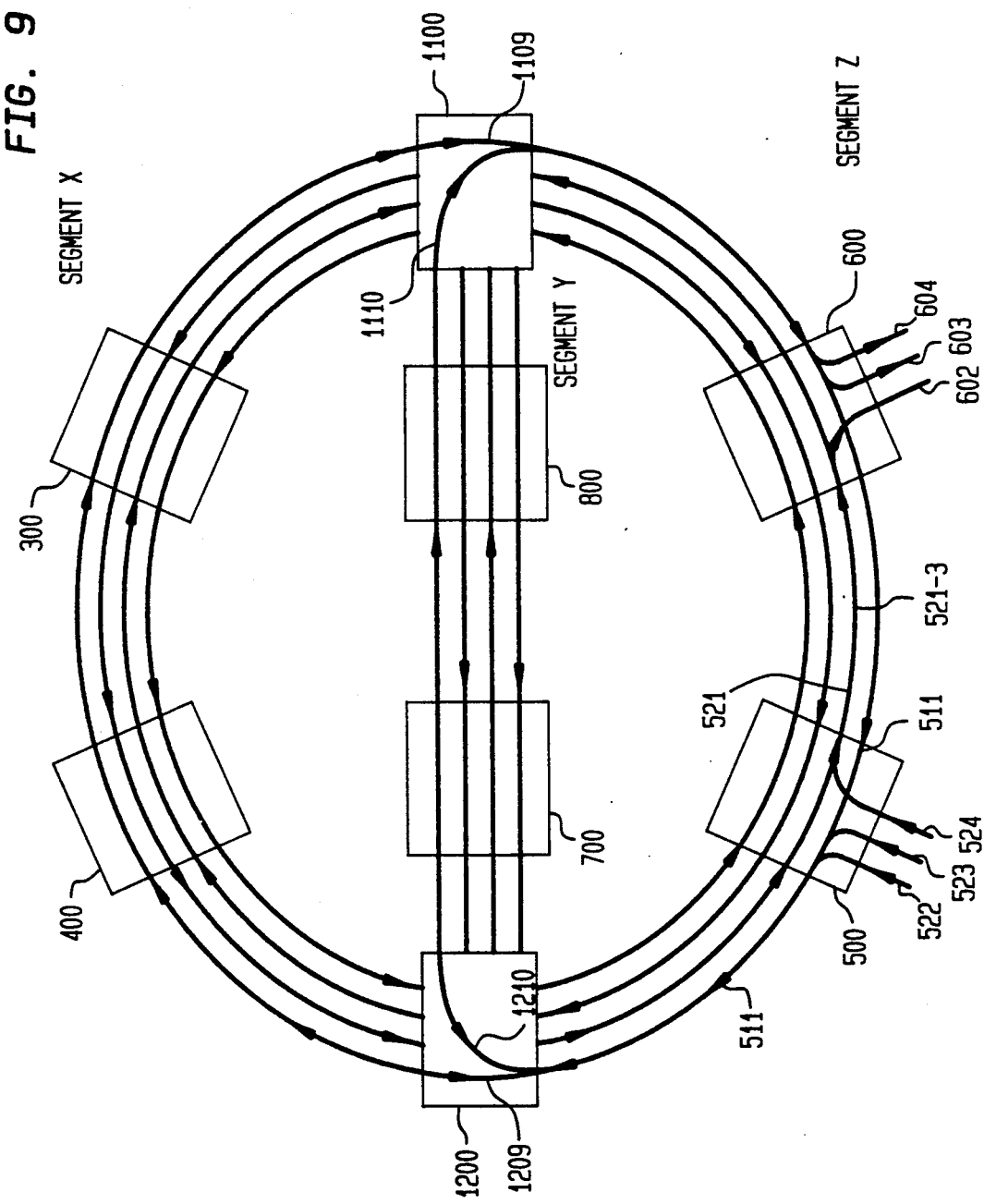
FIG. 9 shows alternative logical rings to facilitate bandwidth sharing for communications between two ADMs on a network segment.

FIG. 9 shows how the bandwidth requirements of traffic from ADM 500 to ADM 600 can be facilitated using different arrangements. Optimally, communication from ADM 500 to ADM 600 would be accomplished directly via subchannel 521-3 where signal 524 is transmitted over subchannel 3 of signal 521 to signal 602 at ADM 600. However, if the available transmission capacity of signal 521 between ADMs 500 and 600 cannot accommodate the bandwidth of the traffic to be transported from ADM 500 to ADM 600, then, our invention provides alternative routes connecting ADMs 500 and 600 which may have spare bandwidth capacity.

Illustratively, information destined for ADM 600 could be transported from signal 522 of ADM 500 to signal 603 of ADM 600 via segment X. Under this arrangement, a logical ring consisting of segments X and Z interconnected at the subchannel level through links 1209 and 1109 of crossconnects 1200 and 1100, respectively, provides an optional route for transporting traffic between ADMs 500 and 600. Alternatively, information destined for ADM 600 could be transported from signal 523 of ADM 500 to signal 604 of ADM 600 via segment Y. Under this arrangement, a logical ring consisting of segments Y and Z interconnected at the subchannel level by links 1210 and 1110 of crossconnects 1200 and 1100, respectively, provides another optional route for transporting traffic between ADMs 500 and 600.

In total, for the network shown in FIG. 9, three distinct types of logical rings can be constructed from the segments X, Y, and Z as depicted in FIGS. 10-12 to facilitate communication between network ADMs. A logical ring may use only a portion of the transmission capacity available on each of its constituent segments. Therefore, available capacity on the under-utilized segments can be shared with other logical rings. In having optional routes to transport traffic between ADMs, the need for major upgrade or modifications in the physical ring network due to exhausted subchannel capacity is eliminated.

Although the present invention has been described primarily with reference to three segments and two crossconnects, my invention can be generalized to encompass whatever physical devices are used to connect subchannels between segments, numerous additional segments, and a plurality of crossconnects. A configuration of a bidirectional ring in a meshed network is shown in FIG. 13, where ADM nodes are now depicted by a circle symbol. As an example, ADMs 1300, 1350 . . . 2000 and 2050 form logical rings using crossconnect nodes 2200 through 2400, which provide the necessary subchannel crossconnections between segments Q, R, S, T, U, V and W. As illustratively shown in FIG. 13, incoming signal 1302 inserted in subchannel 1 at ADM 1300 can be dropped from subchannel 5 as signal 1902 at node 1900 via segments Q, V, and W in the meshed logical ring network.

6.2.7 Network Management Node

The foregoing descriptions presume that the crossconnect nodes route incoming subchannels to assigned outgoing subchannels. This assignment could be static, thus permanently stored in the crossconnect nodes based on a fixed pattern of logical rings desired. To provide more flexibility, reconfiguration of the logical rings on a dynamic basis can be effected with a management node 2200 as depicted in FIG. 14. This arrangement is basically the same as that described above with reference to FIG. 6A with node 2200 shown in overlay fashion; therefore, the reference numbers of FIG. 6A correspond to like elements in FIG. 14.

Node 2200 manages each crossconnect node independently via information transmitted over data communication links 2201 and 2202 coupled to crossconnect nodes 1200 and 1100, respectively. Another arrangement (not shown) for connecting management node 2200 to crossconnect nodes 1200 and 1100 would be to directly link a subset of the crossconnect nodes with data communications links and then utilize logical rings to indirectly link to node 2200. The information allows for node 2200 to administer and coordinate subchannel assignments among the various crossconnect nodes, and node 2200 can be used to issue commands to the crossconnect nodes and to dynamically effect routing changes in the crossconnect nodes such that the logical rings can be reconfigured.

7. CONCLUSION

A bidirectional self-healing logical ring network employing crossconnect nodes to partition the network into independent segments and to interconnect segments at the subchannel level has been disclosed. Advantages of conventional bidirectional ring networks are preserved since logical ring structures are formed through the interconnection of segment subchannels. The use of crossconnect nodes also creates multiple logical-ring routing options for greater flexibility to accommodate bandwidth upgrade request. Numerous other alternative embodiments of the present invention may be devised without departure from the spirit and scope of the following claims.

What is claimed is:

1. A bidirectional ring network composed of logical-ring structures connecting add-drop multiplex nodes (ADMs) said network comprising
    a plurality of independent segments, said segments propagating signals of multiplexed subchannels, and each of said plurality of segments comprising
        a subset of ADMs connected by the network, and
        two pairs of transmission links passing through the subset of links, a first pair of said transmission links transporting signals of multiplexed subchannels under normal and abnormal operating conditions and a second pair of transmission links transporting signals of multiplexed subchannels under abnormal conditions; and
    a plurality of crossconnect nodes which terminate said segments, each of said crossconnect nodes comprising
        means for routing subchannels from an incoming one of said segments to an outgoing one of said segments to configure the logical ring as a cascade of predetermined ones of said segments and preselected ones of said crossconnect nodes, thereby coupling each of the ADM nodes to the other ADM nodes on the logical ring, and
        means for switching and connecting said first pair of transmission links to said second pair of transmission links under abnormal conditions.

2. The network in accordance with claim 1, wherein each of said plurality of segments propagates signals operating at rates independent of signals propagating on other of said plurality of segments and wherein each of said plurality of segments propagate signals having an independent number of multiplexed subchannels.

3. The network in accordance with claim 1, wherein said switching and connecting means is a loop-back switch.

4. The network in accordance with claim 1 further comprising a management node coupled to at least one of said crossconnect nodes for configuring the interconnections between subchannels of said segments terminated at other said crossconnects.

5. A self-healing meshed network comprising
    a plurality of logical-ring segments each propagating multiplexed subchannels, each of said segments comprising
        add-drop multiplex nodes (ADMs) connected by the network, and
        two pairs of transmission links passing through the subset of ADMs, a first pair of said transmission links transporting signals of multiplexed subchannels under normal and abnormal operation and a second pair of transmission links transporting signals of multiplexed subchannels under abnormal conditions; and
    a plurality of interconnecting means, each of said interconnecting means terminating at least three of said logical-ring segments and interconnecting the multiplexed subchannels of said terminated logical ring segments into a plurality of possible logical rings, each of said plurality of interconnecting means comprising
        means for routing each subchannel from an incoming one of said terminated logical-ring segments to an outgoing one of said terminated logical-ring segments, and
        means for switching and connecting said first pair of transmission links to said second pair of transmission links for each of said terminated logical-ring segments.

6. The network in accordance with claim 5, wherein each of said interconnecting means is a crossconnect node.

7. The network in accordance with claim 6 further comprising a management node coupled to at least one of said crossconnect nodes.

8. The network in accordance with claim 5, wherein said switching and connecting means is a loop-back switch.

* * * * *